United States Patent [19]

Ha

[11] Patent Number: 4,515,259
[45] Date of Patent: May 7, 1985

[54] CLUTCH-OPERATED HILL HOLDER BRAKE SYSTEM

[75] Inventor: Jung Y. Ha, Seoul, Rep. of Korea

[73] Assignee: KIA Industrial Co., Inc., Rep. of Korea

[21] Appl. No.: 396,012

[22] Filed: Jul. 7, 1982

[51] Int. Cl.³ ............................................. B60K 41/24
[52] U.S. Cl. .................. 192/3 H; 192/4 A; 192/13 A; 192/0.049; 137/598; 188/353
[58] Field of Search ............... 192/0.049, 12 C, 12 D, 192/3 H, 13 A, 4 A; 188/353; 303/9; 137/598, 599; 251/141, 324

[56] References Cited

U.S. PATENT DOCUMENTS

| | | | |
|---|---|---|---|
| 2,217,141 | 10/1940 | Sprenkle | 192/3 H |
| 2,345,280 | 3/1944 | Morgan et al. | 137/598 X |
| 2,522,835 | 9/1950 | Mayrath | 192/3 H |
| 2,630,196 | 3/1953 | Weiss et al. | 192/3 H |
| 3,705,643 | 12/1972 | Iwaoka et al. | 192/13 A |

Primary Examiner—George H. Krizmanich
Attorney, Agent, or Firm—Goodman & Teitelbaum

[57] ABSTRACT

A brake control device for preventing backward movement of a vehicle on an uphill road during operation of the clutch pedal after release of the brake pedal, the device including a cylinder body having oil passages for connection between the master cylinder and the wheel cylinders of the vehicle. A spring biased hollow plunger is reciprocably received within the cylinder body to provide flow communication between the oil passages in a first position thereof when the brake pedal is actuated, and to prevent the oil from returning from the wheel cylinders in a second position thereof when the clutch pedal is actuated upon release of the brake pedal. An electromagnetic switch-activated system moves the hollow plunger from the first position to the second position when the clutch pedal is actuated. A second oil path is provided in the cylinder body to supply additional oil from the master cylinder to the wheel cylinders when the hollow plunger is in the second position and the brake pedal is reactuated for an increased braking force.

13 Claims, 8 Drawing Figures

CLUTCH-OPERATED HILL HOLDER BRAKE SYSTEM

This invention relates to a novel electromagnetic brake control device for preventing the backward movement of vehicles on the uphill roads, more particularly to an automatic brake control device for preventing vehicles from moving backward down the hills and for preventing the vehicle engines from stalling due to chauffeurs' unskilled driving at the moment when starting vehicles upward again after stopping said vehicles on the uphill roads for a while.

In the prior brake systems of vehicles, it has happened quite often that the vehicle engine stops running due to the overload applied thereto at the moment when releasing the clutch pedal with the low forward speed gear shifted to start the vehicle upward again after stopping said vehicle on a uphill road or in case of failure of power transmission at the moment when releasing the clutch pedal and simultaneously stepping on the accelerator immediately after releasing the brake pedal, said vehicle slips backward instead of advancing upward due to its own weight, which causes frequent contact accidents between said vehicle and next following vehicles.

Therefore, in order to avoid such troubles mentioned above, it requires the highly experienced skills and techniques of drivers, but it is very hard for fresh drivers to acquire such skills within a short period of time because they must get themselves accustomed over a long period of time to the driving skills in operating the clutch pedal and gearshift and in simultaneous change-over from the accelerator pedal to the brake pedal and vice versa. Accordingly, fresh drivers can not feel free from anxiety against the uphill roads, being always strained, until they become a skilled driver.

As mentioned above, the prior brake systems of vehicles have the inconveniences that the driver must keep stepping on both brake pedal and clutch pedal while stopping the vehicle on a uphill road for a moment.

The object of the present invention is to provide a novel electromagnetic brake control device which an eliminate the aforementioned problems in the prior art.

First to explain the basic principles of the present invention, said electromagnetic brake control device automatically activates a micro and relay switch circuit at the moment when the clutch pedal is depressed immediately after the brakes are applied, whereby the brake lines are closed or blockaded, so that the brakes are kept applied while the clutch pedal is depressed even after the brake pedal is released.

The present invention will now be more particularly described with reference to the accompanying drawings wherein.

Figure 1:
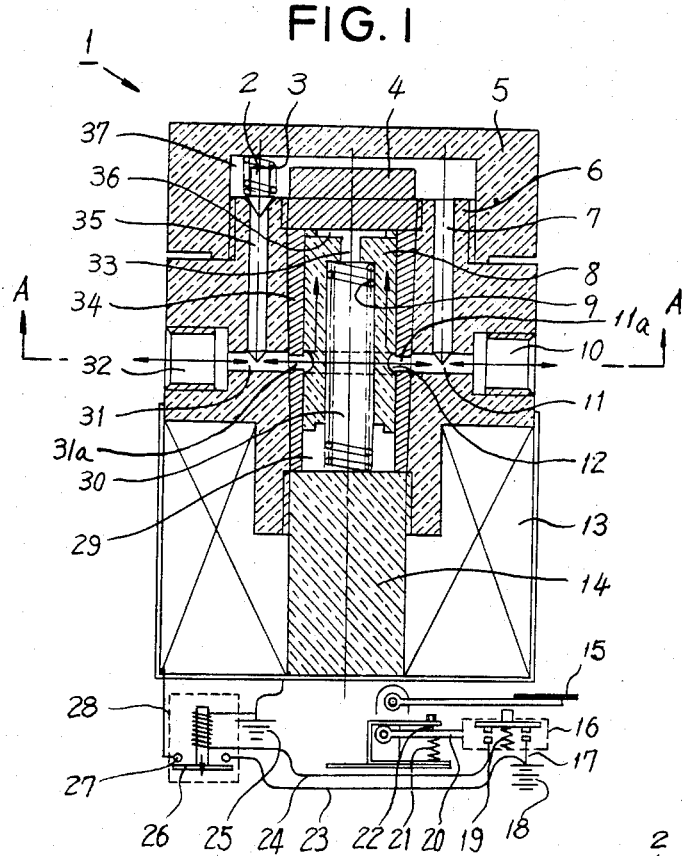
FIG. 1 is a longitudinal sectional view showing an embodiment in accordance with the present invention when only the brakes are applied.

Referring to the drawings wherein like reference numerals refer to like elements and parts, said electromagnetic brake control device 1 comprises:

a cylinder body 6 made of non-ferrous metal having a cylinder liner 34 inserted securely into the inside of said cylinder body 6, bypass oil inlet and outlet passages 35 and 7 both provided longitudinally within said cylinder body 6 on opoosite sides of said liner 34, lateral oil passages 31 and 11 both provided laterally in the middle of said cylinder body 6 wherein the inner ends of said lateral oil passages 31 and 11 are communicated with the respective side holes 31a and 11a of said cylinder liner 34 and the outer ends of said lateral oil passages 31 and 11 are formed into the brake line connecting ports 32 and 10 respectively, the former port 32 being connected to the master cylinder (not shown) and the latter port 10 being connected to the wheel cylinders (now shown) while said bypass oil passages 35 and 7 being communicated with said lateral oil passages 31 and 11, a cylinder head 5 mounted on the top of said cylinder body 6 whereby an upper oil passage 37 is formed between said cylinder body 6 and cylinder head 5, so that said upper oil passage 37 will form a bypass oil passage as a whole together with said longitudinal bypass oil passages 35 and 7 of said cylinder body 6, a check valve 2 provided between said bypass oil passage 35 and said upper oil passage 37, said check valve 2 having a valve spring 3 for preventing the counterflow of oil from said bypass passage 7 to said bypass passage 35, a through-type hollow plunger 8 having an annular groove 12 provided around the periphery thereof and a coil spring 9 inserted into the hollow thereof, said plunger 8 being reciprocated within said cylinder liner 34 by said coil spring 9 and an electromagnet as described hereinafter, an electromagnetic core 14 with an electromagnetic coil 13 wound therearound provided under the lower part of said cylinder body 6.

Furthermore, said electromagnetic brake control device 1 is provided with a micro switch 16 and a relay switch 28 as shown in FIGS. 1 to 7 wherein said micro switch 16 is actuated by a switch lever 20 located properly under the clutch pedal 15 and said relay switch 28 is operated in turn by said micro switch 16 to energize or deenergize said electromagnetic coil 13. Said micro switch lever 20 is provided with a lever adjusting screw 22 for adjusting the position of said switch lever 20 properly under said clutch pedal 15.

Since the micro switch 16 and the relay switch 28 are well known to those skilled in the art, it would not be necessary to describe them in detail.

The following reference numerals of the drawings would not be necessary to be explained in detail wherein:

cylinder liner cover 4 made of non-ferrous metal, electrical cable 17 connecting between the positive pole of the battery 18 and the micro switch 16, micro-switch spring 19, micro-switch lever spring 21, electrical cable 23 connecting between the positive pole of the battery 18 and the relay switch input terminal, electrical cable 24 connecting between the micro switch and the relay coil, relay plunger 26,
relay switch output terminal 27 connected to the electromagnetic coil 13.

The operation of said electromagnetic brake control device 1 of the present invention will be as follows.

Figure 2:
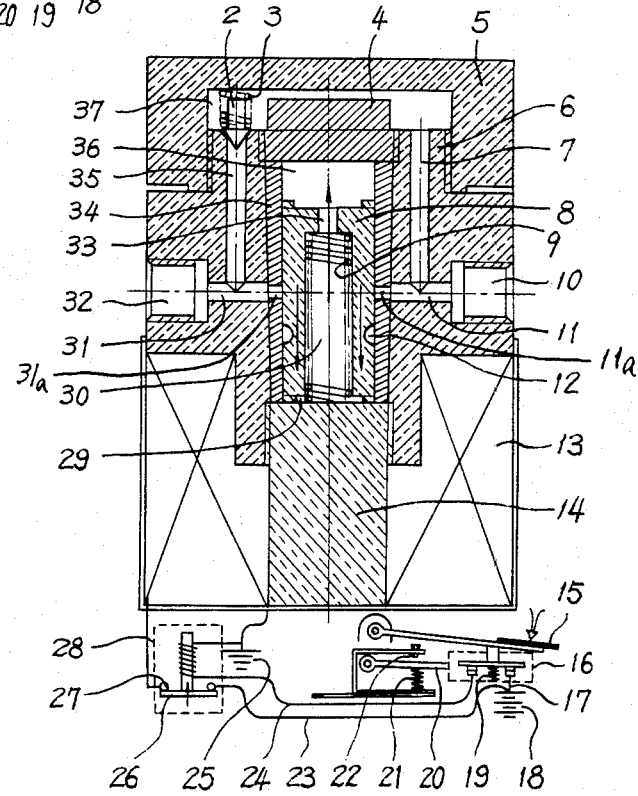
FIG. 2 is a longitudinal sectional view showing the embodiment of FIG. 1 when the clutch pedal of the present invention is depressed.

As shown in FIG. 1, said plunger 8 is normally positioned upward by the spring force of said coil spring 9 in such manner that said lateral oil passages 31 and 11 are aligned with said annular groove 12, so that both brake line connecting ports 32 and 10 can be communicated with each other directly through said lateral oil passages 31 and 11 via said annular groove 12. When said electromagnetic core 14 becomes magnetized, said plunger 8 is attracted thereto against the spring force as shown in FIG. 2, so that said annular groove 12 is positioned downward, deviating from the alignment with said lateral oil passages 31 and 11, and consequently the brake oil communication between said oil passages 31 and 11 will be closed or blockaded. At the next time when said electromagnetic core 14 becomes demagnetized, said plunger 8 returns upward to its initial position by the coil spring 9 to thereby enable the brake oil communication between said oil passages 31 and 11.

In the first embodiment of the present invention as shown in FIGS. 1 and 2, when the brake pedal (not shown) is depressed, the brake oil flows from the master cylinder (not shown) through said brake line connecting port 32, said oil passage 31, said annular groove 12, said oil passage 11 and through said connecting port 10 finally into the wheel cylinders (not shown) whereby the brakes are applied to stop the vehicle. In order to keep the engine running while the brakes are applied, said clutch pedal 15 is depressed whereby said micro switch 16 located thereunder is actuated to operate said relay switch 28 so as to energize said electromagnetic coil 13, so that said electromagnetic core 14 is magnetized and at the same time, said plunger 8 is pulled downward against the spring force of said plunger spring 9, whereby the brake oil communication between said oil passages 31 and 11 through said annular groove 12 will be blockaded and thus the brakes are kept applied even after the brake pedal is released.

To start the vehicle upward again, when releasing said clutch pedal 15 with the first speed gear engaged, said micro switch lever 20 is released at the same time to disconnect the micro switch circuit and to thereby deenergize said relay switch 28 and simultaneously said electromagnetic coil 13, so that said electromagnetic core 14 is demagnetized and said plunger 8 is returned upward to its initial position by said spring force whereby said annular groove 12 is aligned and communicated with said oil passages 31 and 11 to let the brake oil return to the master cylinder and to thereby release the brakes applied to the wheel cylinders and to transmit the engine power to the wheels as the accelerator pedal (not shown) is depressed.

In case that said clutch pedal 15 is depressed before the brakes are fully, applied, that is, in case that enough oil pressure is not fully applied to the wheel cylinders due to an early closure or blockage of said oil passages 31 and 11 by said plunger 8, resulting in a weak braking force of the wheel cylinders, the brake pedal may be depressed again or repeatedly to increase the braking force whereby an additional brake oil flows through said bypass oil passages 35 and 7 via said upper oil passage 37 into the wheel cylinders by pushing up said check valve 2 against said check valve spring 3.

According to said advantageous constructions of the present invention, the backward flow of brake oil from the wheel cylinders to the master cylinder through said oil passages 31 and 11 as well as through the bypass oil passages 35, 37 and 7 can be completely prevented by check valve 2 and by said plunger 8 whereby the brakes are kept applied while depressing the clutch pedal 15 even after the brake pedal is released and therefore, the brake operations of vehicles can be safely carried out without bringing about the danger of backward movements as the case in the prior brake systems of vehicles, particularly when starting vehicles upward again after stopping them on the uphill roads for a while.

Likewise, in case of stopping vehicles provided with said electromagnetic brake control devices 1 of the present invention by first stepping on said clutch pedal 15 and next applying the brake pedal, the brake oil pressed out from the master cylinder flows via said port 32 through the bypass oil passages 35, 37, 7 and through said port 10 into the wheel cylinders by pushing through said check valve 2 whereby the brakes are applied to stop the vehicles.

Figure 3:
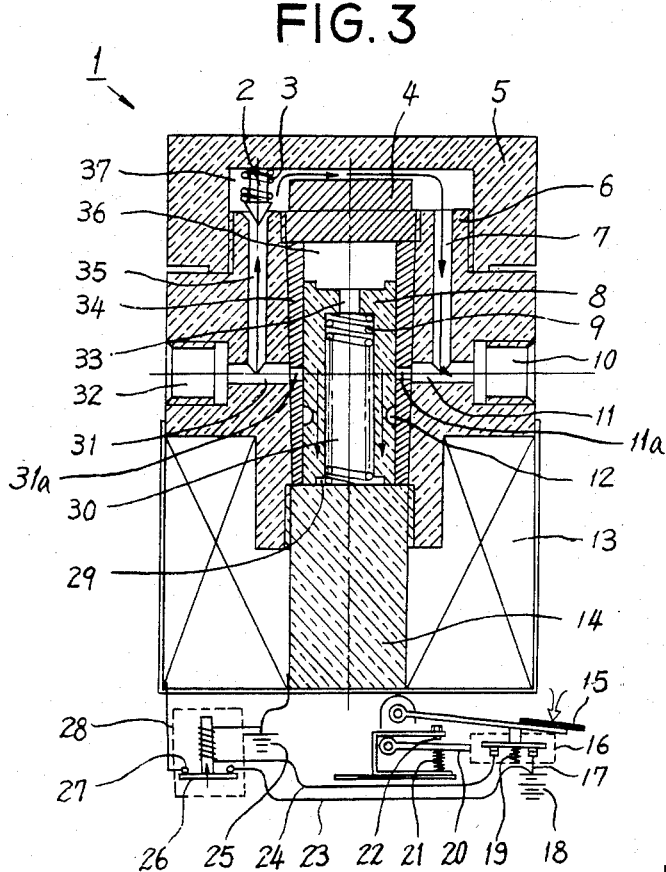
FIG. 3 is a longitudinal sectional view showing the embodiment of FIGS. 1 and 2 when the brake pedal is depressed after stepping on the clutch pedal.
Figure 4:
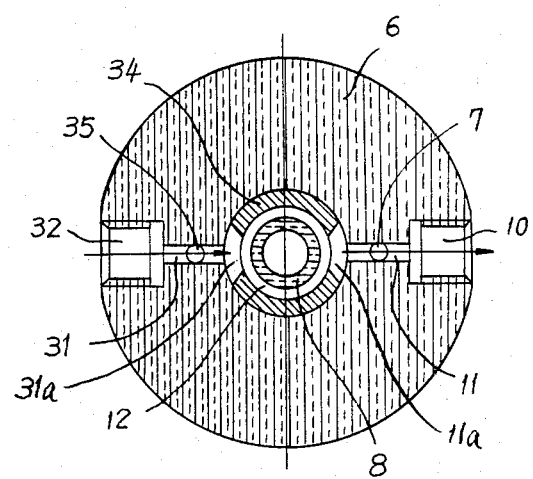
FIG. 4 is a transverse cross-sectional view taken on the line A—A of FIG. 1.

According to another embodiment of the present invention as shown in FIGS. 5 to 8, said through-type hollow plunger 8 and said coil spring 9 are inserted upside down into said cylinder liner 34, and a through-type electromagnetic core 14a having an opening in the center thereof is used instead of said electromagnetic core 14 as shown in FIGS. 1 to 3 wherein an additional core-type plunger 8a is inserted into said through-type core 14a, said core-type plunger 8a having a guide rod 8b projecting from the top thereof.

Figure 5:
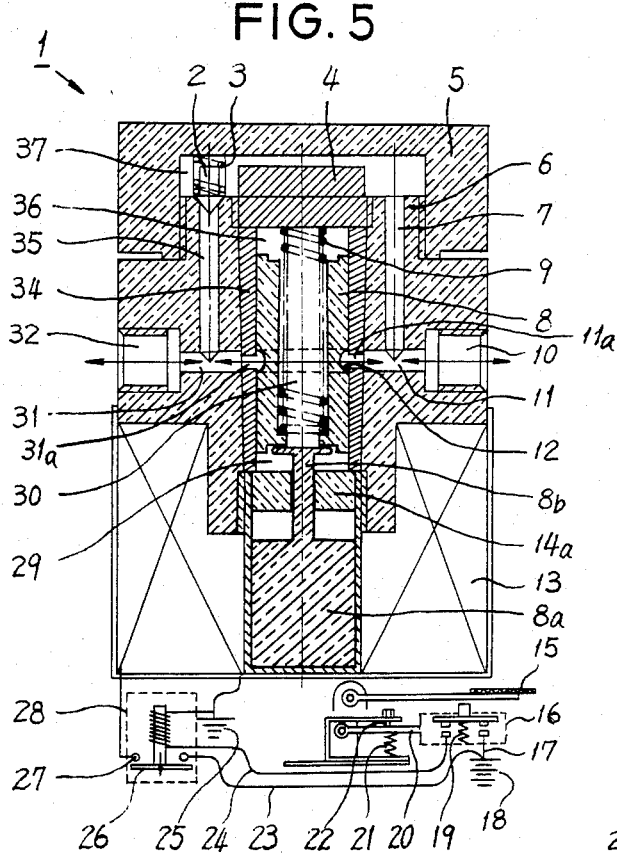
FIGS. 5 to 8 are the similar views of another embodiment in accordance with the present invention as shown in FIGS. 1 to 4 of the first embodiment respectively.
Figure 6:
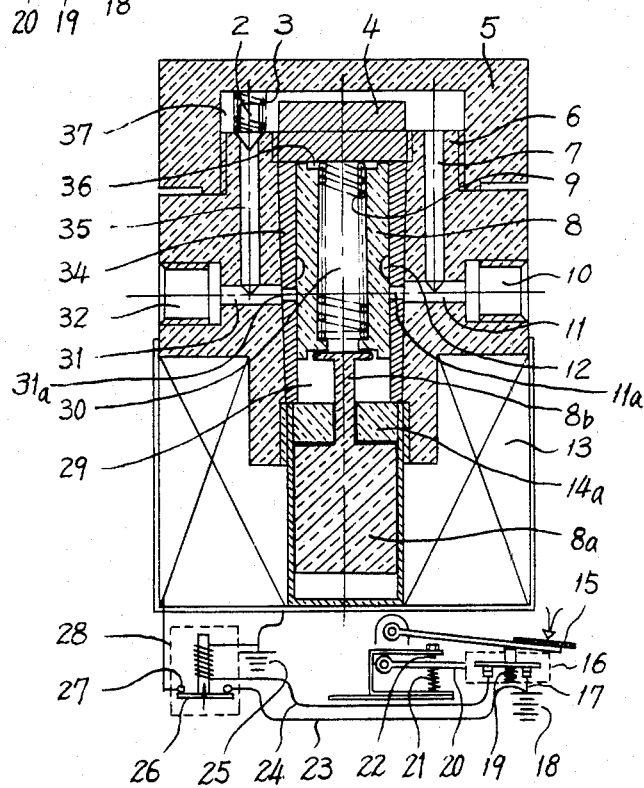
Figure 7:
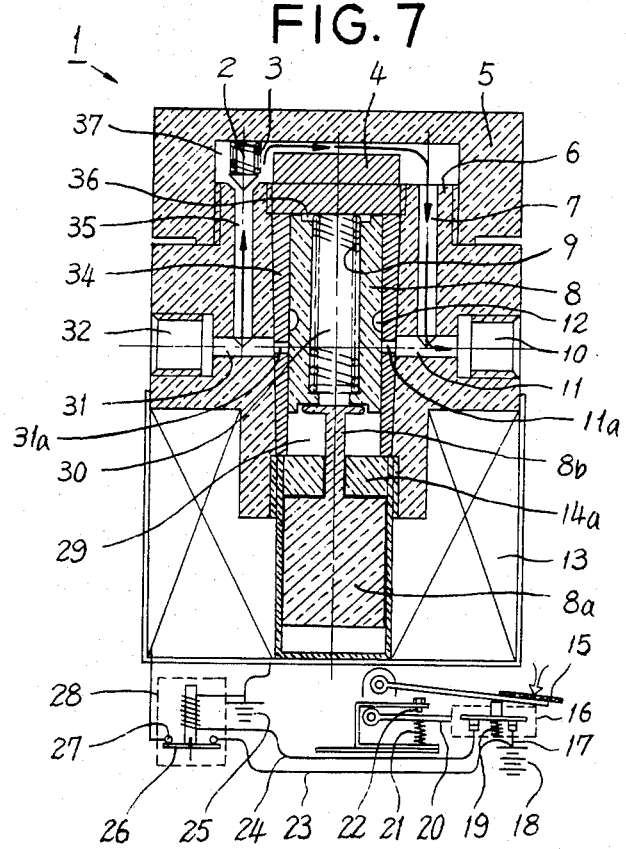
Figure 8:
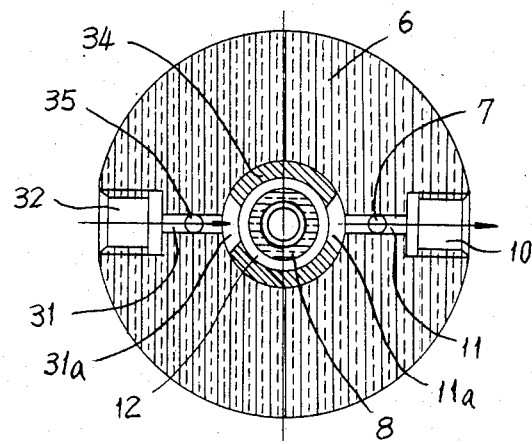

The normal brake operation of the above another embodiment of the present invention as shown in FIG. 5 is the same as that of the first embodiment described hereinbefore. But on the contrary to the first embodiment, when the clutch pedal 15 is depressed as shown in FIG. 6, the micro switch 16 is actuated and at the same time the relay switch 28 is operated to thereby energize said electromagnetic coil 13, so that both of said through-type elelctromagnetic core 14a and core-type plunger 8a become magnetized and accordingly said core-type plunger 8a swings upward, whereby said guide rod 8b of said core-type plunger 8a will push said through-type hollow plunger 8 upward and thereby the brake line between the master cylinder and the wheel cylinder will be blockaded due to the non-alignment of said annular groove 12 and said oil passages 31 and 11. Next, when releasing said clutch pedal 15, said micro switch 16 is disconnected and simultaneously the relay switch 28 is opened to deenergize said electromagnetic coil 13, so that said through-type core 14a and said core-type plunger 8a are demagnetized, whereby said hollow plunger 8 returns downward to the initial position due to the spring force of said plunger spring 9 and consequently said annular groove 12 is aligned and communicated with said oil passages 31 and 11. The other operating procedures are the same as in the first embodiment.

According to another embodiment of the present invention, said brake control device may be a hydraulic type which will be constructed in such fashion that the through-type hollow plunger hole 33 is securely closed and the clutch oil under pressure is forced into the plunger head chamber 36 when the clutch pedal is depressed to thereby push down the hollow plunger 8.

Furthermore, said electromagnetic brake control device may be replaced with a mechanical type in which said plunger 8 can be operated mechanically or manually.

According to further embodiments of the present invention, said check valve 2 can be globe-shaped, and the micro and relay switches may be properly modified as needed. And said plunger 8 may be provided with an "O"-ring around the periphery thereof, and said cylinder liner 34 may be formed integrally with the cylinder body 6.

I claim:

1. A brake control device for preventing backward movement of a vehicle on an uphill road during operation of a clutch pedal of the vehicle after release of a brake pedal of the vehicle which is connected to a master cylinder and wheel cylinders of the vehicle, said brake control device comprising:

a cylinder body provided with first and second lateral oil passages, a first brake line connecting port in flow communication with said first oil passage for connection to the master cylinder, and a second brake line connecting port in flow communication with said second oil passage for connection to the wheel cylinders;

said cylinder body having a longitudinal opening in flow communication with each of said first and second oil passages;

a hollow plunger reciprocably received within said longitudinal opening of said cylinder body, said hollow plunger being provided with an annular groove around a periphery thereof;

spring means extending into said hollow plunger to force said hollow plunger into a first position with said annular groove in alignment with each of said first and second oil passages to provide flow communication therebetween so that oil can flow from the master cylinder through said first brake line connecting port, said first oil passage, said annular groove, said second oil passage, said second brake line connecting port, respectively, to the wheel cylinders when the brake pedal is actuated;

first means to move said hollow plunger against the force of said spring means into a second position with said annular groove out of alignment with each of said first and second oil passages to prevent flow communication therebetween so that the oil is prevented from returning from the wheel cylinders when the clutch pedal is actuated upon release of the brake pedal;

said first means including an electromagnetic core provided with an electromagnetic coil wound therearound, said electromagnetic core being mounted on said cylinder body for acting on said hollow plunger;

micro switch means electrically connected to said electromagnetic coil and positioned under the clutch pedal for energizing said electromagnetic coil when the clutch pedal is actuated; and second means provided in said cylinder body to provide a second oil path from the master cylinder to the wheel cylinders to supply additional oil to the wheel cylinders when said hollow plunger is in said second position and the brake pedal is reactuated for an increased braking force.

2. A brake control device according to claim 1, wherein said micro switch means includes a micro switch positioned under the clutch pedal, and adjusting means for adjusting the position of said micro switch relative to the clutch pedal, said adjusting means including an adjusting screw disposed against a lever of said micro switch.

3. A brake control device according to claim 1, wherein said spring means includes a coil spring inserted into said hollow plunger, said coil spring being disposed against said electromagnetic core to force said hollow plunger away from said electromagnetic core into said first position.

4. A brake control device according to claim 1, including non-return valve means in said second oil path of said second means to allow said addition oil to flow only to the wheel cylinders.

5. A brake control device according to claim 4, wherein a cylinder head is mounted on said cylinder body, an inner surface portion of said cylinder head being spaced from said cylinder body to provide an upper oil passage between said cylinder head and said cylinder body, said cylinder body including longitudinal inlet and outlet bypass oil passages, said inlet bypass oil passage being disposed in flow communication between said first oil passage and said upper oil passage, said outlet bypass oil passage being disposed in flow communication between said second oil passage and said upper oil passage, said upper oil passage and said inlet and outlet bypass oil passages defining said second oil path of said second means.

6. A brake control device according to claim 5, wherein said non-return valve means includes a check valve provided between said inlet bypass passage and said upper oil passage.

7. A brake control device according to claim 6, wherein said check valve is constructed as a globe.

8. A brake control device according to claim 1, including a cylinder liner disposed in said longitudinal opening of said cylinder body against inner walls of said longitudinal opening, said cylinder liner being provided with two side holes therethrough in flow communication with said first and second oil passages, respectively.

9. A brake control device according to claim 8, wherein said cylinder liner is integral with said cylinder body.

10. A brake control device according to claim 1, wherein said electromagnetic core includes a core member fixed relative to said cylinder body, and a reciprocable core plunger provided with a guide rod, said core member being provided with a central opening therethrough for receiving said guide rod, a free end of said guide rod being disposed against said hollow plunger for moving said hollow plunger from said first position to said second position when said electromagnetic coil is energized.

11. A brake control device according to claim 10, where a cylinder head is mounted on said cylinder body, said spring means including a coil spring inserted into said hollow plunger, said coil spring being disposed against said cylinder head to force said hollow plunger against said guide rod into said first position.

12. A brake control device according to claim 1, wherein said hollow plunger is provided with an "O"-ring around a periphery thereof.

13. A brake control device according to claim 1, including means to operate said hollow plunger hydraulically by oil pressure when the clutch pedal is depressed.

* * * * *